May 19, 1942.　　　M. H. LOUGHRIDGE　　　2,283,680
JUSTIFYING MECHANISM
Filed May 15, 1940　　　2 Sheets-Sheet 1
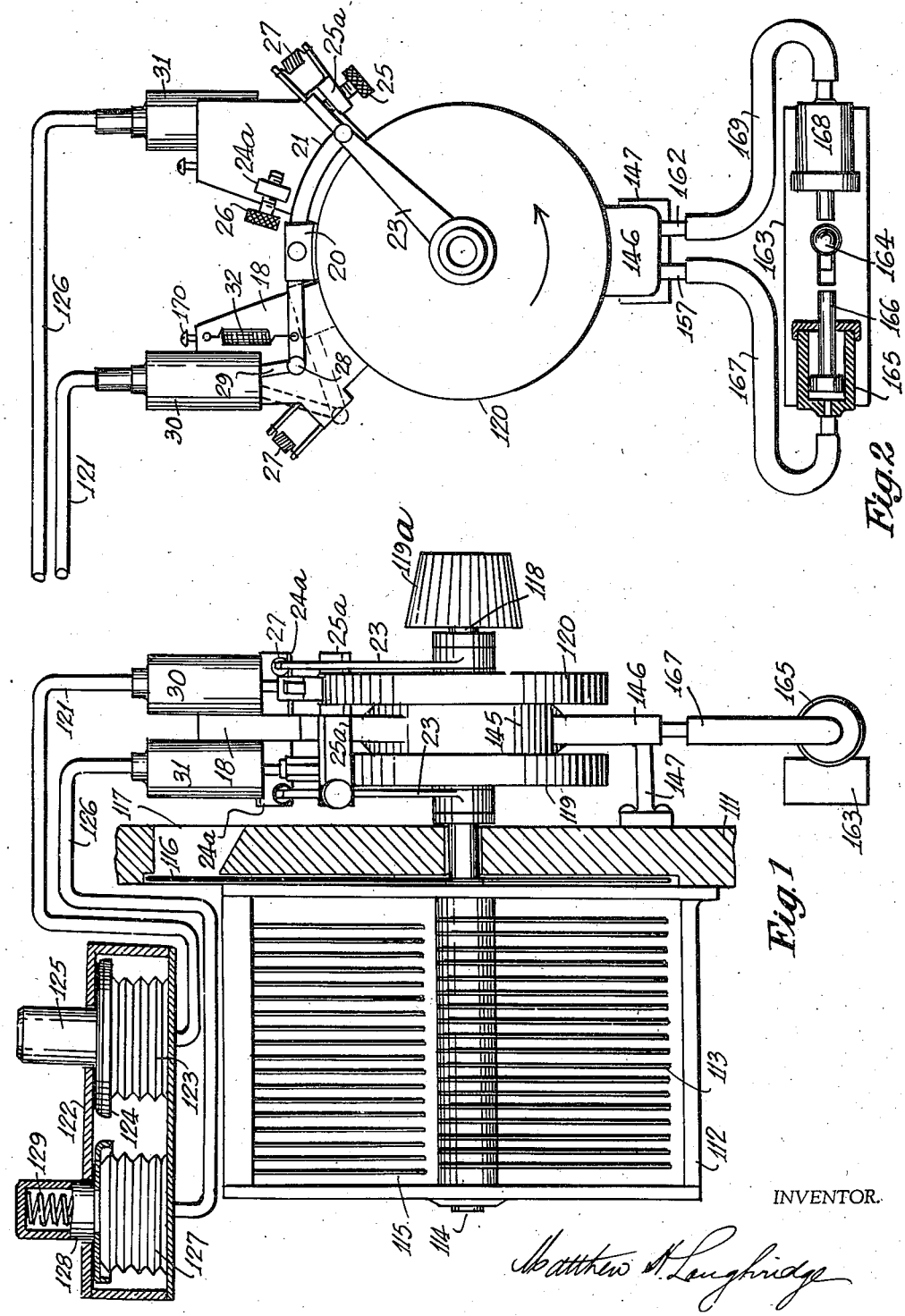
INVENTOR.
Matthew H. Loughridge May 19, 1942.  M. H. LOUGHRIDGE  2,283,680
JUSTIFYING MECHANISM
Filed May 15, 1940   2 Sheets-Sheet 2
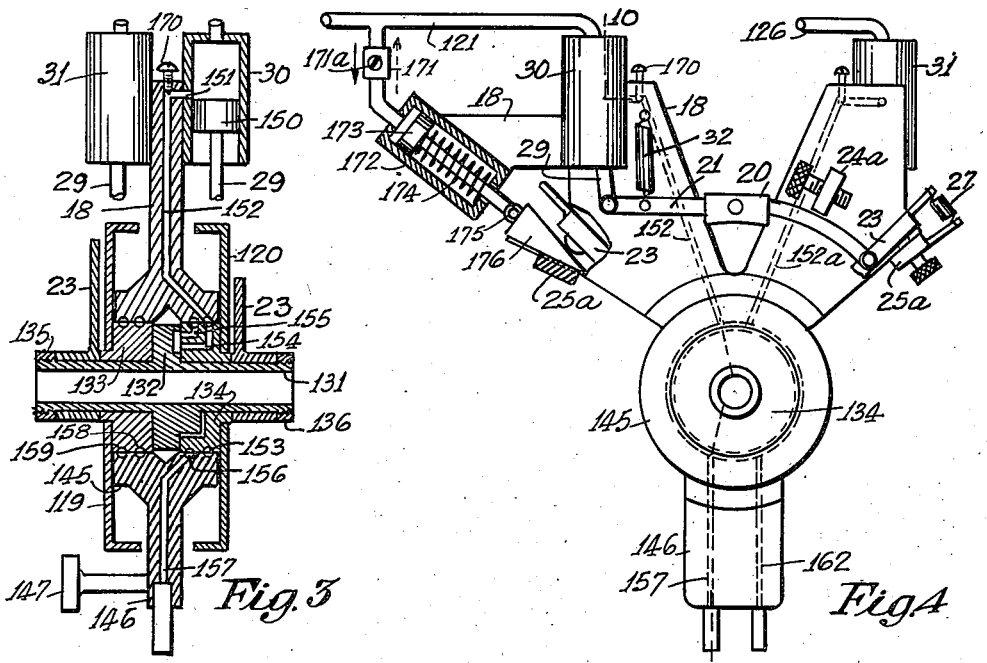
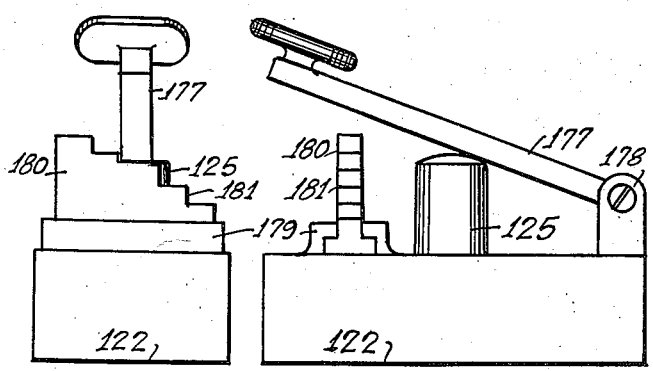
INVENTOR.
Matthew H Loughridge Patented May 19, 1942

2,283,680

UNITED STATES PATENT OFFICE 2,283,680

JUSTIFYING MECHANISM

Matthew H. Loughridge, Bogota, N. J.

Application May 15, 1940, Serial No. 335,391

28 Claims. (Cl. 74—1)

This invention relates to a justifying mechanism which may be operated by remote control or may be operated by direct operation and it is adaptable to adjust articles by linear motion, or by rotary motion and the article to be adjusted may be embodied in the mechanism itself.

One object of the invention is to adjust an object starting at any position and to vary the extent of the adjustment as desired. Another object of the invention is to adjust an object by a stepping motion in which the steps may be varied as to length; another object of the invention is to adjust an object in a normal and in a reverse direction; another object of the invention is to provide a mechanism, pneumatically operated, and remotely controlled for adjusting the object, and another object of the invention is to adjust the object by means of a friction wheel which is effectively engaged in any position.

A further object of the invention is to provide a justifying mechanism operated by pressure in a pair of air conduits and cooperatively operating a translating device; another object of the invention is to provide a justifying mechanism having means for adjusting the object in two directions and means for controlling a translating device by the adjusting means; another object of the invention is to provide a justifying mechanism operated pneumatically by remote control in steps for adjusting an object, with means for varying the length of the steps by the control, and another object of the invention is to provide a justifying mechanism for adjusting an object which permits the free movement of the object independently of the mechanism.

These and other objects of the invention, and the construction and operation of the apparatus, will be more particularly understood from the following specification and the accompanying drawings, in which:

Fig. 1 is an elevation, partly sectioned, of a justifying mechanism applied to a rotating shaft;

Fig. 2 is a front view, partly sectional, of the mechanism in Fig. 1;

Fig. 3 is a vertical section on line 10—10 of Fig. 4 of the justifying mechanism;

Fig. 4 is a front view of the justifying mechanism, partly sectioned, and with one of the friction drums removed;

Fig. 5 is a vertical section of the sleeve and valve mechanism used in Fig. 3;

Fig. 6 is a front view of Fig. 5 on line 13—13;

Fig. 7 is a front view of the opposite side of Fig. 5 on line 14—14;

Fig. 8 is a face view of one of the driving discs located against the left side of Fig. 5;

Fig. 9 is a face view of the opposite driving disc, located against the right side of Fig. 5;

Fig. 10 is a side elevation of a graduated lever for operating the air supply, and Fig. 11 is an end elevation of Fig. 10.

The justifying mechanism

The justifying mechanism of this invention comprises a shaft which, in one application, is connected with the object to be adjusted and this shaft is moved by a stepping action in one, or in both directions, until the required adjustment is made.

A drum is associated with the shaft, a friction shoe is provided for this drum and a lever is provided for applying the friction shoe to the drum. One end of this lever is mounted on a pivot which is free to make an arcuate movement about the center of the drum and the opposite end of the lever, by a suitable mechanism, is operated to bring the shoe into engagement with the drum and then to rotate the shoe and the drum to the extent of the free movement of the pivot. Suitable springs are provided to release the shoe from the drum and to restore the pivot to the starting position after each operation. The extent of the rotation of the drum is determined by the free movement of the pivoted end of the lever about the center of the drum. This movement is readily adjustable so that the movement of the drum for each step can be readily adjusted as desired. The arcuate movement of the pivoted end of the lever about the center of the drum insures that the shoe engages the drum with a uniform engagement throughout the movement.

The shoe and lever described are constructed in accordance with a common form of braking apparatus. The shoe engages the drum in any position and rotates it in the direction for which it is designed up to the limit of the step. The shoe in this case instead of braking or stopping the drum, is itself mounted for rotation about the drum and rotates the drum as it engages therewith.

Where the mechanism is used for adjusting an object in two directions a pair of shoes with operating levers are used, one engaging the drum to rotate it in one direction and the other engaging the drum to rotate it in the reverse direction.

The mechanism is operated by the movement of the lever against the retracting springs. This may be secured manually, by fluid pressure, or by the use of electricity. When operated pneumatically, or electrically, a remote control system may be employed so that adjustments can be set up at a distance by the central manipulation of the controls. Where the apparatus to be adjusted is relatively light, the mechanism may be operated by air pressure obtained from a bulb or manually operated bellows.

The justifying mechanism shown herein is similar in some respects to structure disclosed in my copending application Serial No. 315,300, filed January 24, 1940.

*Adjusting a rotating object*

The justifying mechanism in Figs. 1 and 2 is applied to a rotating shaft which, by a stepping action, is adjusted in a normal and reverse direction. The actual application is applied to a radio tuning system and, by remote control, through a pair of conduits and a pair of keys the radio dial is stepped forward in one direction by the operation of one key and it is stepped backwards in the reverse direction by the operation of the other key. In addition to this, the length of the steps for each operation may be reduced by the rapid operation of the controlling key so that a closer adjustment may be obtained. The justifying mechanism is, preferably, operated pneumatically and by careful operation of the controlling keys the length of the steps can be regulated. To make this operation more convenient an adjusting mechanism is associated with the controlling key whereby the impulses produced by the key may be increased or decreased.

The complete operation of a radio system requires that the operating switch be turned on and then the dial adjusted to the station desired or afterwards changed to another station and, finally, the operation of the switch again to shut off the radio. This is provided in the remote control of the justifying mechanism by a valve arrangement in the mechanism itself which operates the switch in one direction when one of the keys is held in the operated position and the second key is operated at the same time, and the reverse of this condition is obtained to move the switch in the opposite direction when the order in which the keys are operated is reversed.

In the drawings, 111 is the cabinet of the radio set, having the frame 112 with the tuning condenser 113 mounted on shaft 114 and adjustable with relation to the fixed condenser 115. A dial 116 is mounted on shaft 114 and is exposed through window 117 in the cabinet to indicate the setting.

The justifying mechanism comprises the friction drum 119 and the friction drum 120 rotatably mounted on frame 145 which has the extension 146 and the foot 147 secured to the cabinet 111 to hold the frame in a non-rotating position. The drums 119 and 120 rotate about shaft 114 at the center and this shaft has an extension 118 upon which the adjusting knob 119a is mounted. The drums 119 and 120 are normally free to rotate and the application of the justifying mechanism does not interfere with the manual setting of the apparatus by the knob 119a.

Cylinder 30, by the flexible conduit 121 connects with the bellows 123, operated by the key or plunger 125, in the remote control device 122, and cylinder 31, by the flexible conduit 126, connects to the bellows 127, operated by the plunger 128, through the cap 124 and which plunger is normally held in the raised position by spring 129. The remote control device 122 by means of the flexible conduits 121 and 126 is portable and may be moved to any convenient location.

The construction of the justifying mechanism will be understood from Figs. 3 and 4. A sleeve 131 is made to engage the end of shaft 114 with a turning engagement and the stem 118 of the knob 119a engages the outer end of the sleeve with a turning engagement. This sleeve is provided with a flange valve or collar 132 in the center which is used as a valve as hereinafter described. The collar 133 is rotatably mounted on sleeve 131 and the drum 119 is rigidly secured to this collar. A similar collar 134 is mounted on the other end of the sleeve to which the drum 120 is rigidly secured. The arm 23 is mounted on sleeve 131 and is held in place by the screw collar 135. The corresponding arm 23 for drum 120 is mounted on the opposite end of the sleeve and is held in place by the screw collar 136. The entire mechanism is assembled upon the sleeve 131.

The frame 18 is provided with a hub which receives the collars 133 and 134 but stands clear of the collar 132, the sleeve 131 and the collars are freely rotatable in the hub 145. The drive from the drum 119 to the sleeve 131 is obtained as indicated in Figs. 5, 6 and 7. Collar 133 of drum 119 is provided with an arcuate slot 141 in which the lug 137 of the collar 132 is free to move subject to the restriction of spring 142. When collar 133 is rotated in the direction of the arrow, the lug 137 engages the end of the slot 141 and the collar 132 and sleeve 131 is rotated thereby. A similar construction is provided for collar 134 of drum 120 in which lug 139 from collar 132 engages the end of the slot 143 and is normally held in this position by the spring 144.

When piston 150 in cylinder 30 reaches the down position port 151 is opened to conduit 152 in frame 18 which connects with the annular conduit 153 between collar 134 and hub 145. A parallel annular conduit 156 is formed between collar 134 and hub 145 and this conduit has an outlet through 157 in the extension 146 of the frame. Normally the annular conduits 153 and 156 are disconnected and the air pressure in conduit 152 produces no useful effect.

A side outlet 154 is provided for the annular conduit 153 and an adjacent side outlet 155 is provided for the annular conduit 156. These conduits stand normally closed against the face of collar 132 except when the valve aperture 140 registers with the outlets 154 and 155 and connects these conduits to form a continuous passage for the air from cylinder 30 to the outlet 157 at the bottom of the frame.

The construction of collar 132 has a valve arrangement obtained by the valve aperture 138 registering with the conduits 160 and 161 to provide a corresponding continuous passage for the air from cylinder 31 through conduit 152a to conduit 162. Normally this conduit is closed by the face of collar 132 until the valve aperture 138 is brought into register with 160 and 161.

When the plunger 125 is compressed, cylinder 30 is energized and through piston rod 29 lever 21 is depressed to the position shown dotted which engages the shoe 20 with the drum 120 and moves the arm 23 about the center of the drum from the stop 25a to the stop 24a and against the action of spring 27. The adjustable stops determine the extent of the rotary movement of the drum for one complete operation. When the plunger 129 is depressed, cylinder 31 is energized and the opposite lever is brought into engagement with drum 119 to rotate the shaft 114 in the opposite direction. It is apparent that if the plungers of the operating device are only partially operated there will only be a partial stepping movement, and with care in manipulating the plungers this movement can be reduced to a very small amount.

The regulated mechanism in Figs. 10 and 11 may be used for operating the plungers to a restricted condition. This mechanism is mounted on the operating device 122 and comprises the lever 177, pivoted at 178 and engaging the top of the plunger 125. The downward movement of the plunger is restricted by the step block 180 provided with steps 181 and slidably adjustable at 179 relative to the lever 177. This block is moved under the lever to restrict its free movement as desired.

The operation of the switch in one direction is obtained by holding down the plunger 128 and then operating plunger 125. Plunger 128 energizes cylinder 31 and moves the drum 119 and through the lug 137 moves the sleeve 131. In this position the lever is held in engagement with the drum 119 so that as long as plunger 128 is depressed the drum 119 is no longer free to move. When the plunger 125 is now depressed the cylinder 30 is energized and the drum 120 is rotated in the opposite direction to which drum 119 rotates but as drum 119 is now held against rotation the drive through lug 139 and collar 134 is transmitted to the lug 137 in slot 141 in a direction to compress spring 142 and to move the valve chamber 138 into register with the conduits 160 and 161, thereby completing an air passage from cylinder 31 to conduit 162 and through the flexible conduit 169 to cylinder 168, connected with the tumbler switch 163. The piston of cylinder 168 engages the tumbler switch 164 and moves the switch into the opposite position. When the pressure on plunger 128 is released the lug 137 is restored by spring 142 to its normal position so that the impulse set up by plunger 128 is cancelled by the opposite impulse set up by plunger 125.

When the plunger 125 is depressed first and plunger 128 is afterwards depressed while 125 is held in the depressed position, air pressure is supplied to the cylinder 30 to move the drum 120 and then air pressure is supplied to cylinder 31 to move the drum 119 in the reverse direction to the movement of 120. The movement of 119, when 120 is held against movement, through the driver 137, moves the lug 139 in the slot 143 to compress the spring 144 and to bring the valve chamber 140 into register with the conduits 154 and 155, thereby completing the passage for air pressure from cylinder 30 to conduit 157 and through the flexible conduit 167 to cylinder 165 associated with switch 163 causing the piston 166 to engage the tumbler switch 164 to move the switch to the opposite position. This provides a selective operation of the switch without interfering with the operation of the justifying mechanism. When the justifying mechanism is to be used alone without the switch control the conduit between the cylinders 30 and 31 may be shut off by the screw 170 where it leads to the hub of the frame. The operation of the rotary valve in flange 132 is obtained by relative movement between collar 133 and the flange and the collar 134 and the flange, that is relative movement between the brake drums and the sleeve or shaft 131. Any construction that will restrict the movement of the drum while the flange is moved will operate to open the valve and continue the conduit through the mechanism and deliver air pressure for any useful purpose. A rotary form of valve is shown in Figs. 3 to 9 between the drums and the flange 132 so that it may be operative in any position of the drums.

It will be noted that the two drums 119, 120 normally move together on the sleeve or shaft 131 and when one is engaged for a stepping movement, the other is released. In this case the two drums operate as a single drum and turn with the shaft in both directions. When the valve is operated by the relative movement of the drum to the shaft, it is connected to the shaft through a lost motion in the slot 141, or slot 144 providing for a movement that will operate the valve. The lost motion is normally taken up by the springs in the slot so that the drums move as a single drum until the valve is to be operated.

The stepping motion is adjusted by adjusting the stops for the arm 23. The rotary movement of the drum is determined solely by the free movement of arm 23 between the stops, which may be adjusted to produce steps that are an even multiple of the diameter of the drum. The wear of the shoe 20 on the drum is absorbed by the lost motion of the piston in the cylinder, this wear does not vary the motion produced by the stepping action. In Fig. 4 a method of securing this adjustment by the control apparatus is shown. This comprises the sliding wedge 176 which slides on the fixed support 25a and engages the arm 23. This wedge is controlled by pressure in cylinder 172 acting upon piston 173 which is opposed by spring 174 and connects to wedge 176 at 175. Air pressure is supplied to cylinder 172 from the air conduit 121, through check valve 171. The check valve admits the air freely to cylinder 172 but retards its escape when the plunger is restored so that if the plunger is operated fairly rapidly air builds up in cylinder 172 and forces the wedge 176 forward to restrict the free movement of arm 23. On the other hand, if the plunger is operated relatively slowly the air escapes through the check valve from cylinder 172 and the wedge 176 remains in its normal position.

The mechanism rotates the drum and, if necessary, the shaft 114, in one direction only by the application of fluid pressure to one cylinder; also it rotates the drum in the reverse direction only by the application of fluid pressure to the other cylinder. An operation by one cylinder can be cancelled by an operation of the other cylinder which cancellation can be instantly made. Without the reverse operation it would be necessary to step the drum for a revolution in order to cancel a single step. This would take time and is not always possible in practice. Where the steps are to be varied in length a movable stop for the arm is necessary. The movable stop 176 is part of the mechanism which is operated with the adjusting mechanism.

The preferred application of the stepping mechanism is shown in Fig. 4 in which the brake shoe is spaced approximately 45° from the moving arm and is centrally located on the brake lever.

Where rotary adjustment is shown and is referred to as the adjustment of a shaft, it should be understood that the same mechanism may be adapted for lineal adjustment without departing from the intent of the invention.

The apparatus described is operated by a pair of air conduits which are preferably made of rubber tubing. For operating light mechanisms the manual operation supplies the power necessary and it is always ready for use.

In some of the illustrations, the apparatus is shown in diagram form to show the principles of operation instead of the actual construction which should be varied to suit the conditions to which it is to be applied.

Having thus described my invention, I claim:

1. A justifier mechanism comprising a shaft to be adjusted in two directions, a drum mounted on said shaft, a lever for rotating said drum in one direction, a second drum mounted on said shaft, a lever for rotating said second drum in a direction opposite to the first drum, a cylinder with a piston connected with the first lever, a second cylinder with a piston connected with the second lever, an air pressure generator connected with the first cylinder and a second air pressure generator connected with the second cylinder.

2. A justifying mechanism comprising a shaft to be adjusted, a pair of drums on said shaft rotating with the shaft and free to be rotated to a limited extent relative to each other, a first remotely located means for rotating the first drum in one direction, a second remotely located means for rotating the second drum in a direction opposed to the direction of rotation of the first drum, means for rotating one of said drums relative to the other by operating both of said remotely located means at the same time and translating means controlled by the relative rotation of said drums.

3. A justifying mechanism comprising a shaft to be adjusted, a pair of drums on said shaft rotating with the shaft and free to be rotated to a limited extent relative to each other, a first remotely located means for rotating the first drum in one direction, a second remotely located means for rotating the second drum in a direction opposed to the direction of rotation of the first drum, means for rotating one of said drums relative to the other in one direction by operating the first means and operating the second means when the first means is in the operated position, a first translating means controlled by said relative rotation of the drums and means for rotating one of said drums relative to the other in a reverse direction by operating the second means and then operating the first means when the second means is in the operated position, and a second translating means controlled by said last relative rotation of the drums.

4. A justifying mechanism comprising a shaft to be adjusted, a pair of drums on said shaft rotating with the shaft and free to be rotated to a limited extent relative to each other, a first pneumatic mechanism engaging one of said drums to rotate the shaft in one direction, a second pneumatic mechanism engaging the other drum to rotate the shaft in the opposite direction, independent pressure control means for operating each pneumatic mechanism, means for rotating one of said drums relative to the other by operating each pressure control means at the same time, a valve controlled by the relative movement of said drums and a translating device controlled by said valve.

5. A justifying mechanism comprising a mechanism to be adjusted, a member having a limited free movement frictionally engaging said mechanism, a cylinder with a plunger engaging said member to effect the adjustment, a fluid pressure conduit connected to said cylinder and means for varying said limited free movement operated by said fluid pressure.

6. A justifying mechanism comprising a mechanism to be adjusted, a movable member frictionally engaging said mechanism, means for adjusting the movement of said member, a second means engaging said member to effect the adjustment and remotely located means for operating said adjusting means and said second means.

7. A justifying mechanism comprising a mechanism to be adjusted, a member having a limited free movement frictionally engaging said mechanism, a cylinder with a plunger engaging said member to effect the adjustment, a fluid pressure conduit connected to said cylinder, a second cylinder connected with said fluid pressure and means operated by said second cylinder for adjusting the free movement of said member.

8. A justifying mechanism comprising a mechanism to be adjusted, a member having a limited free movement frictionally engaging said mechanism, a cylinder with a plunger engaging said member to effect the adjustment, a fluid pressure conduit connected to said cylinder, a second cylinder connected with said fluid pressure through a check valve and means operated against a spring by said second cylinder for adjusting the free movement of said member.

9. A justifying mechanism comprising a mechanism to be adjusted, a member having a limited free movement frictionally engaging said mechanism, a cylinder with a plunger engaging said member to effect the adjustment, a fluid pressure conduit connected to said cylinder, a second cylinder connected with said fluid pressure for adjusting the free movement of said member and means for operating said member by fluid pressure and for operating the adjustment by intermittent fluid pressure.

10. A justifying mechanism comprising a mechanism free to be adjusted in opposite directions, a first member having a limited free movement in one direction frictionally engaging said mechanism, a second member having a limited free movement in the opposite direction frictionally engaging said mechanism, a first cylinder with a plunger operating the first member, a second cylinder with a plunger operating the second member, means in said mechanism for adjusting the free movement of each member as the mechanism is operated and independent, remotely controlled air pressure means connected with said cylinders to operate the mechanism.

11. A justifying mechanism comprising a shaft connected with the mechanism to be adjusted, a drum mounted on said shaft and rotating therewith, an arm on one side of the drum having one end mounted to move about the center of the shaft and having its free end projecting beyond the drum, a second arm mounted on the other side of the shaft and on the opposite side of the center from the first arm, to move about the center of the shaft and having its free end projecting beyond the drum, an adjustment for the free end of each arm, a lever for each arm having one end pivoted to the arm and having a portion frictionally engaging the drum, a cylinder with a piston for each lever for operating the free end of each lever and means for applying fluid pressure to one cylinder to adjust the mechanism in one direction and independent means for applying fluid pressure to the other cylinder to adjust the mechanism in the opposite direction.

12. A justifying mechanism comprising a shaft connected with the mechanism to be adjusted, a frame, a drum mounted on one side of said frame and rotating with said shaft, a second drum mounted on the opposite side of said frame and rotating with said shaft, an arm for the first drum mounted to move about said shaft as a center and having its free end projecting beyond the drum, a second arm for the second drum mounted to move about said shaft as a center and having its free end projecting beyond said drum, an adjustment for the free end of each arm, a lever for each arm having one end pivoted to the free end of each arm and one lever reversed in direction relative to the other, a cylinder with a piston on said frame operatively connected with the free end of each lever and means for applying fluid pressure to one cylinder to adjust the mechanism in one direction and for applying fluid presure to the other cylinder to adjust the mechanism in the opposite direction.

13. A justifying mechanism comprising a shaft coupled to the mechanism to be adjusted, a frame for said shaft, a drum mounted on said shaft and connected therewith by a lost motion connection, an arm on one side of the drum having one end mounted to move about said shaft as a center and a second arm for the opposite side of said drum having one end mounted to move about said shaft as a center, means for adjusting the movement of the free ends of said arms, a lever for each arm having one end pivoted to the free end of the arm and one lever reversed in direction relative to the other, a cylinder with a piston on said frame operatively connected with the free end of each lever, means for applying fluid pressure to one cylinder to adjust the mechanism in one direction and for applying fluid pressure to the other cylinder to adjust the mechanism in the opposite direction and translating means controlled by the lost motion of the drum on the shaft.

14. A justifying mechanism comprising a shaft coupled to the mechanism to be adjusted, a frame for said shaft, a drum mounted on said shaft and connected therewith by a lost motion connection, an arm having one end mounted to move about said shaft as a center, a lever having one end pivoted to the free end of said arm and engaging said drum, a cylinder mounted on said frame having a piston operatively connected with said lever to rotate said drum, a valve operated by the movement of said drum relative to said shaft, a second cylinder, means for applying fluid pressure to said first cylinder to rotate said drum and for operating said valve to apply fluid pressure to the second cylinder.

15. A justifying mechanism comprising a shaft coupled with a lost motion to the mechanism to be adjusted, and having a flange, a frame for said shaft, a drum mounted on said shaft and connected therewith by a lost motion connection, an arm having one end mounted to move about said shaft as a center, a lever having one end pivoted to the free end of said arm and engaging said drum, a cylinder mounted on said frame having a piston operatively connected with said lever to rotate said drum, a valve in said flange operated by the movement of said drum relative to said shaft, a second cylinder, means for applying fluid pressure to said first cylinder to rotate said drum and for operating said valve to apply fluid pressure to the second cylinder.

16. A justifying mechanism comprising a shaft having a flange coupled to the mechanism to be adjusted, a frame for said shaft, a collar mounted on said shaft on each side of said flange and each coupled to the flange with a lost motion connection, a drum mounted on each collar, a lever having one end pivotally mounted to move about the center of said shaft and engaging said drum, a second lever pivotally mounted to move about the center of said shaft and reversed with respect to the first lever and engaging the second drum to rotate it in the reverse direction, a cylinder with a piston for operating each lever to rotate the drums, a valve operated by the movement of the first drum relative to the shaft, a cylinder with a piston controlled by said valve, and a second valve operated by the movement of the second drum relative to the shaft, and a second cylinder with a piston operated by the second valve, and means for supplying fluid pressure to the cylinders connected with the levers to rotate the drums in either direction.

17. A justifying mechanism comprising a shaft coupled to the mechanism to be adjusted and having a flange, a frame for said shaft, a collar mounted on said shaft on each side of the flange and each coupled to the flange with a lost motion connection, a drum mounted on each collar, a first lever engaging the first drum to rotate the drum in one direction, a second lever engaging said second drum to rotate the drum in the reverse direction, a cylinder with a piston connected with each lever to rotate the shaft, a valve operated by the movement of the first drum relative to the shaft, a second valve operated by the movement of the second drum relative to the shaft, a cylinder with a piston controlled by the first valve and a second cylinder with a piston controlled by the second valve and means for arresting the movement of one drum and moving the other drum to operate one of said valves.

18. A justifying mechanism comprising a shaft coupled to the mechanism to be adjusted and having a flange, a frame for said shaft, a collar mounted on said shaft on each side of the flange and each coupled to the flange with a lost motion connection, a drum mounted on each disc, a first lever engaging the first drum to rotate the drum in one direction, a second lever engaging said second drum to rotate the drum in the reverse direction, a cylinder with a piston connected with each lever to rotate the shaft, a valve operated by the movement of the first drum relative to the shaft, a second valve operated by the movement of the second drum relative to the shaft, a cylinder with a piston controlled by the first valve and a second cylinder with a piston controlled by the second valve and means for operating either valve by stopping the movement of one drum and rotating the other drum.

19. A justifying mechanism comprising a shaft coupled to the mechanism to be adjusted and having a flange, a frame for said shaft, a collar mounted on said shaft on each side of the flange and each coupled to the flange with a lost motion connection, a drum mounted on each disc, a first lever engaging the first drum to rotate the drum in one direction, a second lever engaging said second drum to rotate the drum in the reverse direction, a cylinder with a piston connected with each lever to rotate the shaft, a valve operated by the movement of the first drum relative to the shaft, a second valve operated by the movement of the second drum relative to the shaft, a cylinder with a piston controlled by the first valve and a second cylinder with a piston controlled by the second valve and means for arresting the movement of one drum in any position and moving the other drum to operate one of said valves.

20. A justifying mechanism comprising a shaft coupled to the mechanism to be adjusted, a frame for said shaft, a collar with a drum mounted on said shaft and coupled to the shaft with a lost motion connection, a valve operated by the movement of said drum relative to said shaft, a lever engaging said drum to rotate the drum, a cylinder with a piston operatively connected with said lever, a second cylinder with a piston, a conduit controlled by said valve connecting said first cylinder with said second cylinder, means for supplying air pressure to said first cylinder to adjust said mechanism and means for operating said valve to supply the air pressure from the first cylinder to the second cylinder by taking up the lost motion in the connection between the drum and the shaft.

21. A justifying mechanism comprisng a shaft coupled to the mechanism to be adjusted and having a flange, a frame for said shaft, a collar mounted on said shaft on each side of the flange and each coupled to the flange with a lost motion connection, a drum mounted on each collar, a first lever engaging the first drum to rotate the drum in one direction, a second lever engaging said second drum to rotate the drum in the reverse direction, a cylinder with a piston connected with each lever to rotate the shaft, a valve operated by the movement of the first drum relative to the shaft, a second valve operated by the movement of the second drum relative to the shaft, a conduit controlled by one of said valves connecting the first cylinder with a third cylinder, and another conduit controlled by the other valve connecting said second cylinder with a fourth cylinder and means for suplying air pressure to said third cylinder by taking up the lost motion between one drum and the shaft and for supplying air pressure to the fourth cylinder by taking up the lost motion between the other drum and the shaft.

22. A justifying mechanism comprising a shaft coupled to a mechanism to be adjusted, a frame for said shaft, a drum mounted to rotate with said shaft, an arm mounted at one end to rotate about said shaft as a center and means for adjusting the movement of the free end of said arm, a lever pivoted at one end to said arm and engaging said drum, a cylinder with a piston on said frame connected with said lever to rotate the drum in steps by air impulses to the limit of said free movement, air bellows with a conduit connected with said cylinder to operate the lever and means for adjusting said bellows to vary the air impulses.

23. A justifying mechanism comprising a shaft coupled to the mechanism to be adjusted, a drum mounted on said shaft, an arm mounted at one end to move about said shaft as a center and means for adjusting the movement of the free end of said arm, a lever pivoted at one end to said arm and engaging said drum, a cylinder with a piston connected with said lever to rotate the drum in steps to the limit of said free movement, manually operated air bellows with a conduit connected with said cylinder and adjustable stops for controlling the operation of said bellows to supply a predetermined air impulse to said cylinder.

24. A justifying mechanism comprising a shaft coupled to the mechanism to be adjusted, a drum mounted on said shaft, an arm mounted at one end to move about said shaft as a center, a second arm mounted at one end to move about said shaft as a center, means for adjusting the movement of the free end of each arm, a first lever pivoted at one end to the first arm and frictionally engaging said drum to rotate the drum in one direction, a second lever pivoted at one end to the second arm and frictionally engaging said drum to rotate the drum in the opposite direction, a first cylinder with a piston connected to the first lever, a second cylinder with a piston connected to the second lever, a manually operated plunger connected with an air supply and a conduit with the first cylinder to adjust the mechanism in one direction, and a second manually operated plunger connected with an air supply and a conduit with the second cylinder to adjust the mechanism in another direction.

25. A control mechanism having an adjustable member, comprising a shaft coupled to the adjustable member, a first drum mounted on said shaft, and connected to the shaft through a lost motion connection, a second drum connected to said shaft through a lost motion connection, a cylinder for rotating the first drum in one direction and a second cylinder for rotating the second drum in the opposite direction to the first drum, a first valve operated by the movement of the first drum through the lost motion relative to the shaft, a second valve operated by the movement of the second drum through the lost motion relative to the shaft, a mechanism having a third cylinder controlled by the first valve and a fourth cylinder controlled by the second valve and means for supplying air pressure to said cylinders.

26. A control mechanism having an adjustable member, comprising a shaft coupled to the adjustable member, a first drum mounted on said shaft, a second drum mounted on said shaft, a first valve operated by the movement of the first drum when the movement of the second drum is arrested, a third cylinder with a piston operating a mechanism in one direction controlled by said first valve, and a second valve operated by the movement of the second drum when the movement of the first drum is arrested, a fourth cylinder with a piston operating said mechanism in the opposite direction controlled by said second valve and means for supplying air pressure to said cylinders to operate said adjustable member and said mechanism.

27. A justifying mechanism comprising a mechanism to be adjusted, a movable member engaging said mechanism to move it by steps, means in said mechanism for varying said steps, a control device, means operatively connecting said control device with said movable member and with said varying means and means for operating said movable member intermittently by said control device through said connecting means, also operating said varying means by said control device through said connecting means, and means retaining said varying means in position while the movable member is operating.

28. A justifying mechanism comprising a pair of drums mounted on a shaft to be adjusted, a friction shoe for each drum, a lever for each shoe, a pivot for each lever movable about said shaft as a centre, adjustable means for varying the movement of at least one of said pivots, and the pivot of one lever moving in the opposite direction to the pivot of the other lever, a control device, means operatively connecting said control device with said levers and with said adjustable means, means for operating said levers through said connection by said control device to engage the shoe with the drum to rotate the shaft in either direction to the extent of the movement of said pivots and means for operating said adjustable means by said control device through said connection.

MATTHEW H. LOUGHRIDGE.